(12) United States Patent
Huang et al.

(10) Patent No.: US 11,711,751 B2
(45) Date of Patent: Jul. 25, 2023

(54) COMMUNICATION METHOD AND COMMUNICATIONS APPARATUS

(71) Applicant: HUAWEI TECHNOLOGIES CO., LTD., Guangdong (CN)

(72) Inventors: Huang Huang, Chengdu (CN); Kuandong Gao, Chengdu (CN); Mao Yan, Chengdu (CN); Gao Xiang, Chengdu (CN)

( * ) Notice: Subject to any disclaimer, the term of this patent is extended or adjusted under 35 U.S.C. 154(b) by 0 days.

(21) Appl. No.: 17/458,538

(22) Filed: Aug. 26, 2021

(65) Prior Publication Data

US 2021/0410046 A1    Dec. 30, 2021

Related U.S. Application Data

(63) Continuation of application No. 16/532,708, filed on Aug. 6, 2019, now Pat. No. 11,115,904, which is a (Continued)

(30) Foreign Application Priority Data

May 5, 2017    (CN) .......................... 201710314110.9

(51) Int. Cl.
*H04W 48/10*    (2009.01)
*H04L 5/00*    (2006.01)
(Continued)

(52) U.S. Cl.
CPC .......... *H04W 48/10* (2013.01); *H04L 5/0044* (2013.01); *H04L 5/0051* (2013.01); *H04W 72/0446* (2013.01); *H04W 72/30* (2023.01)

(58) Field of Classification Search
CPC ............... H04W 48/10; H04W 72/005; H04W 72/0446; H04L 5/0044; H04L 5/0051
(Continued)

(56) References Cited

U.S. PATENT DOCUMENTS

2013/0107828 A1*  5/2013  Dinan ................. H04W 52/143
                                                          370/329
2014/0362701 A1   12/2014  Roh et al.
(Continued)

FOREIGN PATENT DOCUMENTS

CA      2995641 A1   2/2017
CN      102035623 A  4/2011
(Continued)

OTHER PUBLICATIONS

Ericsson, "FeMBMS agreements lisf", 3GPP TSG-RAN WG1 Meeting #87 R1-1613790, Reno, Nevada, USA, Nov. 14-18, 2016, total 3 pages.
(Continued)

*Primary Examiner* — Faisal Choudhury

(57) ABSTRACT

This application provides a communication method and a communications apparatus. The method includes: determining a system frame number of a radio system frame in which a to-be-sent first broadcast channel PBCH is located, to obtain a first transport block, where the first processing manner is used to indicate some bits of the system frame number of the radio system frame in which the first PBCH is located, and the first MIB includes remaining bits, other than the some bits, of the system frame number of the radio system frame in which the first PBCH is located; and sending, by using the first PBCH, the first transport block in the radio system frame.

30 Claims, 5 Drawing Sheets

Related U.S. Application Data continuation of application No. PCT/CN2018/085696, filed on May 4, 2018.

(51) Int. Cl.
*H04W 72/0446* (2023.01)
*H04W 72/30* (2023.01)

(58) Field of Classification Search
USPC .......................................................... 370/254
See application file for complete search history.

(56) References Cited

U.S. PATENT DOCUMENTS

| | | | |
|---|---|---|---|
| 2015/0085717 A1* | 3/2015 | Papasakellariou | H04L 5/14 370/280 |
| 2015/0296518 A1* | 10/2015 | Yi | H04W 72/042 370/336 |
| 2016/0029179 A1* | 1/2016 | Kim | H04W 72/005 370/312 |
| 2016/0234762 A1 | 8/2016 | You et al. | |
| 2017/0070968 A1* | 3/2017 | Kim | H04W 56/0015 |
| 2017/0276761 A1 | 9/2017 | Park et al. | |
| 2017/0289831 A1 | 10/2017 | Park et al. | |
| 2018/0227867 A1* | 8/2018 | Park | H04W 56/001 |
| 2018/0279241 A1* | 9/2018 | Lee | H04W 56/001 |
| 2018/0287845 A1* | 10/2018 | Kim | H04L 5/0053 |
| 2019/0319745 A1* | 10/2019 | Pan | H04L 1/0041 |

FOREIGN PATENT DOCUMENTS

| | | |
|---|---|---|
| CN | 102271023 A | 12/2011 |
| CN | 103944663 A | 7/2014 |
| CN | 105453456 A | 3/2016 |
| CN | 105900361 A | 8/2016 |
| CN | 106455040 A | 2/2017 |
| JP | 2017526209 A | 9/2017 |
| KR | 20150140273 A | 12/2015 |
| KR | 20160147274 A | 12/2016 |
| RU | 2439796 C2 | 1/2012 |
| RU | 2589892 C2 | 7/2016 |
| WO | 2014110949 A1 | 7/2014 |
| WO | 2014173240 A1 | 10/2014 |
| WO | 2015200667 A1 | 12/2015 |
| WO | 2016032200 A2 | 3/2016 |
| WO | 2016036154 A1 | 3/2016 |

OTHER PUBLICATIONS

Ericsson,"Synchronization and acquisition of system information for FeMBMS",3GPP TSG-RAN WG1 Meeting #86bis R1-1609677,Lisbon, Portugal, Oct. 10-14, 2016,total 5 pages.

Ericsson,"Acquisition of Minimum SI",3GPP TSG-RAN WG2 NR Ad Hoc Tdoc R2-1700477,Spokane, USA, Jan. 17-19, 2017,total 8 pages.

Nokia, Alcatel-Lucent Shanghai Bell,"NR-PBCH Design",3GPP TSG-RAN WG1#NR R1-1701060,Spokane, U.S.A., Jan. 16-20, 2017,total 12 pages.

NTT Docomo, INC.,"Discussion on SS periodicity for NR",3GPP TSG-RAN WG1 Meeting #88bis R1-1705707, Spokane, USA, Apr. 3-7, 2017,total 4 pages.

3GPP TS 38.300 V0.2.0 (May 2017);3rd Generation Partnership Project;Technical Specification Group Radio Access Network;NG Radio Access Network; Overall Description;Stage 2(Release 15),total 33 pages.

3GPP TS 38.331 V0.0.2 (Mar. 2017);3rd Generation Partnership Project;Technical Specification Group Radio Access Network;NR-;Radio Resource Control (RRC);Protocol specification(Release 15),total 13 pages.

Huawei et al.,"Multi-beam Paging for NR",3GPP TSG RAN WG1 Meeting #88bis,Spokane, USA, Apr. 3-7, 2017, R1-1704189, total 3 pages.

3GPP TSG RAN WG1 Meeting #88 bis, R1-1705793, ITL:"On NR PBCH Design", Spokane, USA Apr. 3-7, 2017, total 8 pages. XP051243907.

3GPP TSG RAN WG1 Meeting #74, R1-132880, Huawei, HiSilicon:"Further discussion on PBCH coverage improvement for low cost MTC", Barcelona, Spain, Aug. 19-23, 2013, total 4 pages. XP050716124.

3GPP TSG RAN WG1 Meeting #88, R1-1703353 Huawei, HiSilicon,"Discussion on SS burst set composition and SS block time index indication",Athens, Greece, Feb. 13-17, 2017,total 8 pages, XP051210483.

3GPP TSG RAN WG1 Meeting #87, R1-1611261, Huawei, HiSilicon:" NR Primary and Secondary Synchronization Signals Design", Reno, USA, Nov. 14-18, 2016. total 10 pages. XP051175242.

InterDigital Communications,"On Synchronization Signal Periodicity in NR",3GPP TSG RAN WG1 Meeting #88bis Spokane, USA, Apr. 3-7, 2017,R1-1705499,total 6 pages.

Ericsson, Summary of email discussion [89-15] Details for NR-PBCH evaluation. 3GPP TSG RAN WG1 Meeting #89, Hangzhou, China, May 15-19, 2017, R1-1709868, 15 pages.

Spreadtrum Communications, PBCH-DMRS design and time index indication mechanism . 3GPP TSG RAN WG1 Meeting #90, Prague, Czech Republic Aug. 21-25, 2017, R1-1713059, 8 pages.

ZTE, ZTE Microelectronics, NR-PBCH Design. 3GPP TSG RAN WG1 Meeting #88, Athens, Greece Feb. 13-17, 2017, R1-1701577, 11 pages.

* cited by examiner

COMMUNICATION METHOD AND COMMUNICATIONS APPARATUS

CROSS-REFERENCE TO RELATED APPLICATIONS

This application is a continuation of U.S. patent application Ser. No. 16/532,708, filed on Aug. 6, 2019, which is a continuation of International Application No. PCT/CN2018/085696, filed on May 4, 2018, which claims priority to Chinese Patent Application No. 201710314110.9, filed on May 5, 2017. All of the afore-mentioned patent applications are hereby incorporated by reference in their entireties.

TECHNICAL FIELD

This application relates to the communications field, and more specifically, to a communication method and a communications apparatus in the communications field.

BACKGROUND

As mobile services continuously develop, people have a higher requirement on a transmission rate of wireless communication. In a Long Term Evolution (LTE) communications system, before accessing a network device, user equipment (UE) needs to obtain system information (SI) of the network device, to know how the network device is configured, so as to operate correctly in the network device.

In LTE, the network device sends a master information block (MIB) to all UEs in coverage of the network device by using a broadcast channel (for example: physical broadcast channel, PBCH). MIB information includes the highest 8 bits of a 10-bit system frame number (SFN), and the highest 8 bits are used to perform time alignment between the UE and the network device. In the LTE communications system, a transmission time interval (TTI) of the PBCH is 40 ms, a period of the PBCH is 10 ms, and a base station repeatedly transmits the PBCH four times in a TTI of each PBCH.

However, in a new radio (NR) communications system, a synchronization signal (SS) includes: a primary synchronization signal (PSS) and a secondary synchronization signal (SSS). The primary synchronous signal and the secondary synchronous signal as well as a PBCH constitute a synchronization signal block (SSB). At least one SSB constitutes one SS burst, and at least one SS burst constitutes one SS burst set.

Because a TTI of the PBCH in the NR communications system is 80 ms, an SS burst set has a plurality of different periods. For example, a period of the SS burst set may be 5 ms, 10 ms, 20 ms, 40 ms, 80 ms, or 160 ms. Currently, there is still no uniform method for transmitting an SFN in different periods of an SS burst set by using a PBCH.

SUMMARY

This application provides a communication method and a communications apparatus, so that an SFN can be transmitted in different periods of an SS burst set by using a PBCH.

According to a first aspect, this application provides a communication method, where the method includes:

determining a system frame number of a radio system frame in which a to-be-sent first PBCH is located, where the first PBCH is included in a first synchronization signal burst set (SS burst set), and a period of the first SS burst set is one of a plurality of periods;

processing a first master information block (MIB) in a first processing manner, to obtain a first transport block, where the first processing manner is used to indicate some bits of the system frame number of the radio system frame in which the first PBCH is located, and the first MIB includes remaining bits, other than the some bits, of the system frame number of the radio system frame in which the first PBCH is located; and sending, by using the first PBCH, the first transport block in the radio system frame in which the first PBCH is located.

Optionally, that the first processing manner is used to indicate some bits of the system frame number of the radio system frame in which the first PBCH is located may be understood as that the first processing manner is used to indicate, in an implicit manner, the some bits of the system frame number of the radio system frame in which the first PBCH is located, or may be understood as that the first processing manner is used to implicitly indicate the some bits of the system frame number of the radio system frame in which the first PBCH is located. This is not limited in this embodiment of this application.

This application provides the communication method and a communications apparatus, so that an SFN can be transmitted in different periods of an SS burst set by using a PBCH.

In a possible implementation, the first PBCH is sent in a first transmission time interval (TTI), the period of the first SS burst set is a first period of the plurality of periods in the first TTI, and the method further includes: determining a system frame number of a radio system frame in which a second PBCH to be sent in a second TTI is located, where the second PBCH is included in a second SS burst set, and a period of the second SS burst set is a second period of the plurality of periods; processing a second MIB in the first processing manner, to obtain a second transport block, where the first processing manner is used to indicate some bits of the system frame number of the radio system frame in which the second PBCH is located, and the second MIB includes remaining bits, other than the some bits, of the system frame number of the radio system frame in which the second PBCH is located; and sending, by using the second PBCH, the second transport block in the radio system frame in which the second PBCH is located.

Optionally, the first processing manner is further used to indicate the some bits of the system frame number of the radio system frame in which the first PBCH is located.

In a possible implementation, the method further includes: determining a system frame number of a radio system frame in which a third PBCH to be sent in a third TTI is located, where the third PBCH is included in a third SS burst set, and a period of the third SS burst set is a third period of the plurality of periods; processing a third MIB in the first processing manner, to obtain a third transport block, where the first processing manner is used to indicate some bits of the system frame number of the radio system frame in which the third PBCH is located, and the third MIB includes remaining bits, other than the some bits, of the system frame number of the radio system frame in which the third PBCH is located; and sending, by using the third PBCH, the third transport block in the radio system frame in which the third PBCH is located.

In a possible implementation, the method further includes: determining a system frame number of a radio system frame in which a fourth PBCH to be sent in a fourth TTI is located, where the fourth PBCH is included in a fourth SS burst set, and a period of the fourth SS burst set is a fourth period of the plurality of periods; processing a fourth MIB in the first processing manner, to obtain a fourth transport block, where the first processing manner is used to indicate some bits of the system frame number of the radio system frame in which the fourth PBCH is located, and the fourth MIB includes remaining bits, other than the some bits, of the system frame number of the radio system frame in which the fourth PBCH is located; and sending, by using the fourth PBCH, the fourth transport block in the radio system frame in which the fourth PBCH is located.

In a possible implementation, the method further includes: determining a system frame number of a radio system frame in which a fifth PBCH to be sent in a fifth TTI is located, where the fifth PBCH is included in a fifth SS burst set, and a period of the fifth SS burst set is a fifth period of the plurality of periods; processing a fifth MIB in the first processing manner, to obtain a fifth transport block, where the first processing manner is used to indicate some bits of the system frame number of the radio system frame in which the fifth PBCH is located, and the fifth MIB includes remaining bits, other than the some bits, of the system frame number of the radio system frame in which the fifth PBCH is located; and sending, by using the fifth PBCH, the fifth transport block in the radio system frame in which the fifth PBCH is located.

In a possible implementation, the method further includes: determining a system frame number of a radio system frame in which a sixth PBCH to be sent in a sixth TTI is located, where the sixth PBCH is included in a sixth SS burst set, and a period of the sixth SS burst set is a sixth period of the plurality of periods; processing a sixth MIB in the first processing manner, to obtain a sixth transport block, where the first processing manner is used to indicate some bits of the system frame number of the radio system frame in which the sixth PBCH is located, and the sixth MIB includes remaining bits, other than the some bits, of the system frame number of the radio system frame in which the sixth PBCH is located; and sending, by using the sixth PBCH, the sixth transport block in the radio system frame in which the sixth PBCH is located.

In the communication method provided in this embodiment of this application, in two or more different periods of an SS burst set, a base station does not need a corresponding SFN transmission method in each period of the SS burst set, but transmits the remaining bits of the system frame number by using the first MIB, and the first processing manner used to process the first MIB implicitly indicates the some bits of the system frame number. Therefore, computational complexity of the base station and UE can be reduced, and complexity of detecting an SFN by the UE is reduced.

In a possible implementation, the some bits include the $2^{nd}$ least significant bit (for example, the $2^{nd}$ least bit) and the $3^{rd}$ least significant bit (for example, the $3^{rd}$ least bit).

In a possible implementation, the some bits include the least significant 3 bits (for example, the least 3 bits).

In a possible implementation, the first processing manner includes at least one of a cyclic redundancy check (CRC), a cyclic shift, and scrambling.

According to a second aspect, this application provides a communication method, where the method includes:

obtaining a transport block sent by a network device by using a PBCH, where the PBCH is included in a synchronization signal burst set (SS burst set), and a period of the SS burst set is one of a plurality of periods;

processing the transport block in a processing manner, to obtain a master information block (MIB); and obtaining, in the processing manner, some bit positions of a system frame number of a radio system frame in which the PBCH is located and bits in the some bit positions (referred to as some bits hereinafter), where the MIB includes remaining bits, other than the some bits, of the system frame number of the radio system frame in which the PBCH is located; and determining, based on the some bits and the remaining bits, the system frame number of the radio system frame in which the PBCH is located.

In the communication method provided in this embodiment of this application, in two or more different periods of an SS burst set, a base station does not need a corresponding SFN transmission method in each period of the SS burst set, but obtains the some bit positions and bits in the some bit positions in a processing manner of blind detection on the transport block. The MIB is also obtained in the processing manner, where the MIB includes the remaining bits. Based on the some bits and the remaining bits, the system frame number of the radio system frame in which the PBCH is located is then obtained. Therefore, computational complexity of the base station and UE can be reduced, and complexity of detecting an SFN by the UE is reduced.

In a possible implementation, the some bits include the $2^{nd}$ and $3^{rd}$ least significant bits.

In a possible implementation, the some bits include the least significant 3 bits.

In a possible implementation, the processing manner includes at least one of a cyclic redundancy check (CRC), a cyclic shift, and descrambling.

According to a third aspect, this application provides a communications apparatus for data transmission, configured to perform the method according to the first aspect or any possible implementation of the first aspect.

According to a fourth aspect, this application provides a communications apparatus for data transmission, configured to perform the method according to the second aspect or any possible implementation of the second aspect.

According to a fifth aspect, this application provides a communications apparatus for data transmission, where the communications apparatus includes: a memory, a processor, a transceiver, and a computer program that is stored in the memory and can be run on the processor. When executing the computer program, the processor performs the method according to the first aspect or any possible implementation of the first aspect.

Optionally, the processor and the memory that are included in the apparatus may be further implemented by using chips.

According to a sixth aspect, this application provides a communications apparatus for data transmission, where the communications apparatus includes: a memory, a processor, a transceiver, and a computer program that is stored in the memory and can be run on the processor, and when executing the computer program, the processor performs the method according to the second aspect or any possible implementation of the second aspect.

Optionally, the processor and the memory that are included in the apparatus may be further implemented by using chips.

According to a seventh aspect, this application provides a computer readable medium, configured to store a computer program, where the computer program includes an instruction used to perform the method according to the first aspect or any possible implementation of the first aspect.

According to an eighth aspect, this application provides a computer readable medium, configured to store a computer program, where the computer program includes an instruction used to perform the method according to the second aspect or any possible implementation of the second aspect.

According to a ninth aspect, this application provides a computer program product including an instruction, where when the computer program product is run on a computer, the computer performs the method according to the first aspect or any possible implementation of the first aspect.

According to a tenth aspect, this application provides a computer program product including an instruction, where when the computer program product is run on a computer, the computer performs the method according to the second aspect or any possible implementation of the second aspect.

DESCRIPTION OF EMBODIMENTS

The following describes technical solutions of this application with reference to accompanying drawings.

Figure 1:
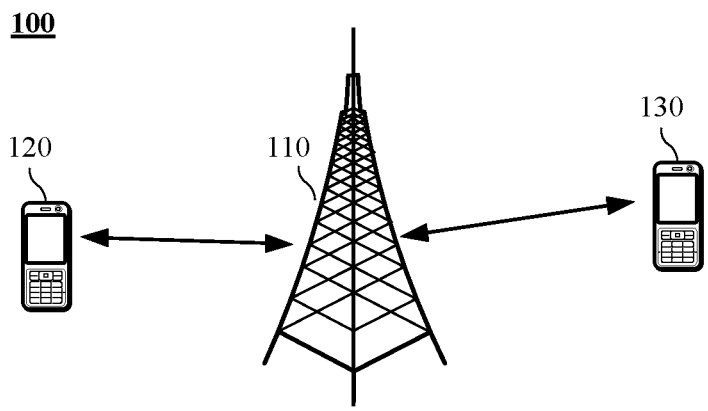
FIG. 1 is a schematic architectural diagram of a wireless communications system according to an embodiment of this application.

FIG. 1 shows a wireless communications system 100 according to an embodiment of this application. The wireless communications system 100 may include at least one network device. FIG. 1 shows a network device 110. The network device 110 may provide communication coverage for a specific geographical area, and may communicate with a terminal device located in the coverage area. The network device 110 may be a network device (for example: base transceiver station, BTS) in a GSM system or a CDMA system, may be a network device (for example: NodeB, NB) in a WCDMA system, may be an evolved network device (for example: evolved Node B, eNB, or eNodeB) in an LTE system, or may be a radio controller in a cloud radio access network (CRAN). Alternatively, the network device may be a core network, a relay node, an access point, an in-vehicle device, a wearable device, a network-side device in a future 5G network, a network device in a future evolved public land mobile network (PLMN), or the like.

The wireless communications system 100 further includes at least one terminal device located in the coverage of the network device 110. FIG. 1 shows user equipment 120 and user equipment 130.

FIG. 1 shows an example of one network device and two terminal devices. Optionally, the wireless communications system 100 may include a plurality of network devices, each of which may cover another quantity of terminal devices. This is not limited in this embodiment of this application. Optionally, the wireless communications system 100 may further include another network entity, such as a network controller or a mobility management entity. This embodiment of this application is not limited thereto.

It should be understood that user equipment (UE) may be mobile or fixed. The UE may be a terminal device, an access terminal, a subscriber unit, a subscriber station, a mobile station, a mobile console, a remote station, a remote terminal, a mobile device, a user terminal, a terminal, a wireless communications device, a user agent, a user communications apparatus, or the like. The UE may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved PLMN, or the like.

Figure 2:
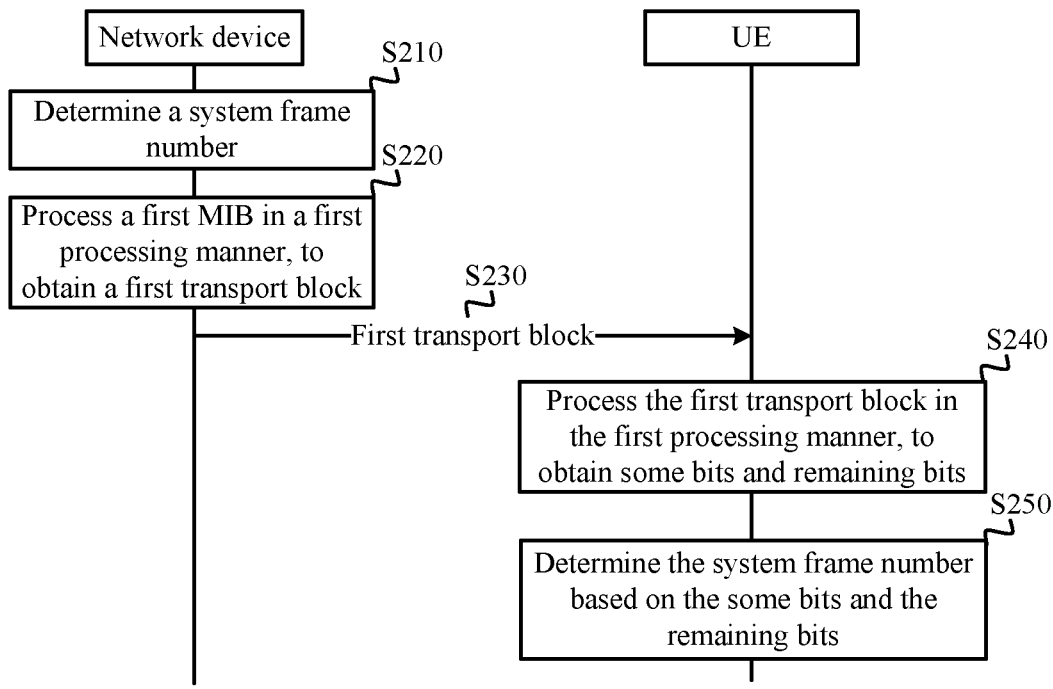
FIG. 2 is a schematic flowchart of a communication method according to an embodiment of this application.

FIG. 2 is a schematic flowchart of a communication method 200 according to an embodiment of this application. The method 200 may be applied to the wireless communications system shown in FIG. 1. The network device may be a base station, for example, may be a cell of a base station. However, this is not limited in this embodiment of this application.

S210: Determine a system frame number of a radio system frame in which a to-be-sent first PBCH is located, where the first PBCH is included in a first synchronization signal burst set (SS burst set), and a period of the first SS burst set is one of a plurality of periods.

It should be understood that, in an NR communications system, a synchronization signal includes a PSS and an SSS. The PSS and the SSS as well as a PBCH form one SSB. At least one SSB forms one SS burst, and at least one SS burst forms one SS burst set.

For example, one PSS, one SSS, and two PBCHs may form one SSB, four SSBs may form one SS burst, and two SS bursts may form one SS burst set.

It should be further understood that, the base station may configure a plurality of periods of an SS burst set for UE. For example, a period of the SS burst set may be 5 ms, 10 ms, 20 ms, 40 ms, 80 ms, or 160 ms. The SS burst set has one period in one TTI. However, this embodiment of this application is not limited thereto.

S220: Process a first master information block (MIB) in a first processing manner, to obtain a first transport block, where the first processing manner is used to indicate some bits of the system frame number of the radio system frame in which the first PBCH is located, and the first MIB includes remaining bits, other than the some bits, of the system frame number of the radio system frame in which the first PBCH is located.

It should be understood that the system frame number of the radio system frame may be indicated by using N consecutive bits. Each bit may be 0 or 1. A position, in the N bits, of each bit is referred to as a bit position. A value of the system frame number may loop from 0 to $2^N$.

For example, when a length of a system frame number is 10 bits, the system frame number 0000000010 indicates a radio system frame 2. A bit in a $9^{th}$ bit position being 1 may be understood as that a $9^{th}$ bit is 1.

Optionally, the first processing manner used by the base station may include at least one of a CRC, a cyclic shift, and scrambling. It should be understood that the first processing manner is used to indicate the some bits.

Optionally, the UE and the base station may agree, in accordance with a protocol, that the first processing manner is scrambling, and on the some bits implicitly indicated through scrambling. Alternatively, the base station may indicate, by using higher layer signaling, to the UE that the first processing manner is scrambling, and may indicate, to the UE, the some bits implicitly indicated in the scrambling manner. This is not limited in this embodiment of this application.

In an optional embodiment, the base station may scramble the first MIB, to obtain the first transport block. The scrambling manner is used to implicitly indicate the some bits.

It should be understood that, for scrambling, a bit-level exclusive OR operation (or multiplication) is performed on a pseudo-random sequence generated by an initialization seed and information bits (remaining bits of the system frame number of the radio system frame in which the first PBCH is located), and the initialization seed is used to implicitly indicate the some bits of the system frame number of the radio system frame in which the first PBCH is located. Alternatively, for scrambling, a pseudo-random sequence generated by one initialization seed is divided into a plurality of segments, and information bits are scrambled by using the plurality of segments of the pseudo-random sequence.

Optionally, the UE and the base station may agree, in accordance with a protocol, that the first processing manner is the CRC, and on the some bits implicitly indicated by using the CRC. Alternatively, the base station may indicate, by using higher layer signaling, to the UE that the first processing manner is the CRC, and may indicate, to the UE, the some bits implicitly indicated by using the CRC. This is not limited in this embodiment of this application.

In an optional embodiment, the base station may perform encoding after adding a CRC bit to a first bit segment in the first MIB by using a CRC mask, to obtain the first transport block. The CRC mask is used to implicitly indicate the some bits.

It should be understood that different CRC masks used for the first MIB may generate different CRC bits. To be specific, one CRC mask may generate a unique CRC bit. It should be further understood that a unique CRC mask corresponds to different information bits.

For example, the some bits may be implicitly indicated by using a CRC mask 0, or the some bits may be implicitly indicated by using a CRC mask 1.

For example, an initial sequence $a_{ini}$ of an N-bit CRC register generating a cyclic redundancy check (CRC) bit is denoted as $a_{ini}=<d_0, d_1, d_2, d_3, \ldots, d_{N-2}, d_{N-1}>$, is also referred to as a CRC mask. Information bits $<b_0, \ldots,$ and $b_n>$ (to be specific, bits included in the first bit segment) are input to the register to generate CRC bits. The CRC bits are placed behind original information bits to form a piece of complete MIB information. The base station further repeats and encodes the complete MIB information, to obtain the first transport block.

Optionally, the UE and the base station may agree, in accordance with a protocol, that the first processing manner is the cyclic shift, and on the some bits implicitly indicated by using the cyclic shift. Alternatively, the base station may indicate, by using higher layer signaling, to the UE that the first processing manner is the cyclic shift, and may indicate, to the UE, the some bits implicitly indicated by using the cyclic shift. This is not limited in this embodiment of this application.

In an optional embodiment, the first processing manner may be the cyclic shift. The base station may perform a precoding cyclic shift or a post-coding cyclic shift on a first bit segment in the first MIB, to obtain the first transport block. A length of the cyclic shift is used to implicitly indicate the some bits.

For example, the cyclic shift is performed in two cases. In one case, the cyclic shift is performed before information bits are encoded. In the other case, the cyclic shift is performed after information bits are encoded. It is assumed that data on which the cyclic shift is to be performed is 10010011. To perform the cyclic shift on the data, the data is divided into four portions, and a length of each portion is two bits (to be specific, the data is divided into 10, 01, 00, and 11). After the cyclic shift is performed on the data by one portion (in other words, a length of the cyclic shift is two bits), 11100100 (to be specific, the last portion of 10010011 is cyclically shifted from the rearmost end to the foremost end) can be obtained. After the cyclic shift is performed on the data by two portions (a length of the cyclic shift is four bits), 00111001 is obtained. After the cyclic shift is performed on the data by three portions (in other words, a length of the cyclic shift is six bits), 01001110 is obtained.

Optionally, the first processing manner may include the CRC and scrambling, or the first processing manner may include the cyclic shift and scrambling, or the first processing manner may include the CRC and the cyclic shift, or the first processing manner may include the CRC, the cyclic shift, and scrambling. This is not limited in this embodiment of this application. For example, when the first processing manner includes the cyclic shift and scrambling, the base station may perform a precoding cyclic shift on the remaining bits of the first MIB, then encode the first MIB, and scramble the encoded first MIB, to obtain the first transport block. A length of the cyclic shift and a scrambling manner are together used to implicitly indicate the some bits.

S230: Send, by using the first PBCH, the first transport block in the radio system frame in which the first PBCH is located. Accordingly, UE in coverage of the base station obtains the first transport block sent by a network device by using the first PBCH. The first PBCH is included in the first synchronization signal burst set (SS burst set), and the period of the first SS burst set is one of the plurality of periods.

Optionally, if the first PBCH is sent in a first TTI, and the period of the first SS burst set is a first period of the plurality of periods in the first TTI, the base station may further determine a system frame number of a radio system frame in which a second PBCH to be sent in a second TTI is located, where the second PBCH is included in a second SS burst set, and a period of the second SS burst set is a second period of the plurality of periods; process a second MIB in the first processing manner, to obtain a second transport block, where the first processing manner is used to indicate some bits of the system frame number of the radio system frame in which the second PBCH is located, to be specific, the some bits, which are implicitly indicated in the first processing manner, of the system frame number of the radio system frame in which the first PBCH is located are the same as the some bits, which are implicitly indicated in the first processing manner, of the system frame number of the radio system frame in which the second PBCH is located, and the second MIB includes remaining bits, other than the some bits, of the system frame number of the radio system frame in which the second PBCH is located; and send, by using the second PBCH, the second transport block in the radio system frame in which the second PBCH is located.

It should be understood that the system frame number of the radio system frame in which the first PBCH is located may be the same as or may be different from the system frame number of the radio system frame in which the second PBCH is located. This is not limited in this embodiment of this application.

To be specific, in different periods of an SS burst set, a system frame number of a radio system frame in which a PBCH is located is transmitted in a uniform processing manner.

S240: The UE processes the first transport block in the first processing manner, to obtain the first master information block (MIB); and obtains, in the first processing manner, some bit positions of the system frame number of the radio system frame in which the first PBCH is located and bits in the some bit positions (referred to as some bits hereinafter), where the first MIB includes the remaining bits, other than the some bits, of the system frame number of the radio system frame in which the first PBCH is located.

It should be understood that the first processing manner used by the UE corresponds to the first processing manner used by the base station. To be specific, the first processing manner used by the UE and the first processing manner used by the base station are an inverse process to each other.

S250: Determine, based on the some bits and the remaining bits, the system frame number of the radio system frame in which the first PBCH is located.

Optionally, the some bits in this embodiment of this application may be the $2^{nd}$ and $3^{rd}$ least significant bits. When a length of the system frame number of the radio system frame is 10 bits, the base station may process the first MIB in the first processing manner, to obtain the first transport block. The first processing manner is used to implicitly indicate the some bits (to be specific, the $2^{nd}$ and $3^{rd}$ least significant bits) of the system frame number of the radio system frame. The first MIB includes the remaining bits (to be specific, the highest significant 7 bits and the least significant 1 bit), other than the some bits, of the system frame number of the radio system frame.

Accordingly, the highest significant 7 bits (for example, the highest 7 bits of the SFN) and the least significant 1 bit (for example, the least bit of SFN) of the system frame number of the radio system frame are indicated to the UE on the PBCH. The $2^{nd}$ and $3^{rd}$ least significant bits (for example, the $2^{nd}$ and $3^{rd}$ least bits of SFN) of the system frame number of the radio system frame are implicitly indicated to the UE by the first processing manner of decoding the PBCH.

For convenience of description, in this embodiment of this application, the bits in the some bit positions are collectively referred to as some bits, and bits, other than the some bits, of the system frame number are collectively referred to as remaining bits.

A method for transmitting an SFN by a base station in a same processing manner (the $2^{nd}$ and $3^{rd}$ least significant bits are implicitly indicated in the first processing manner) in different periods of an SS burst set by using a PBCH is described below in detail with reference to FIG. 3.

Figure 3:
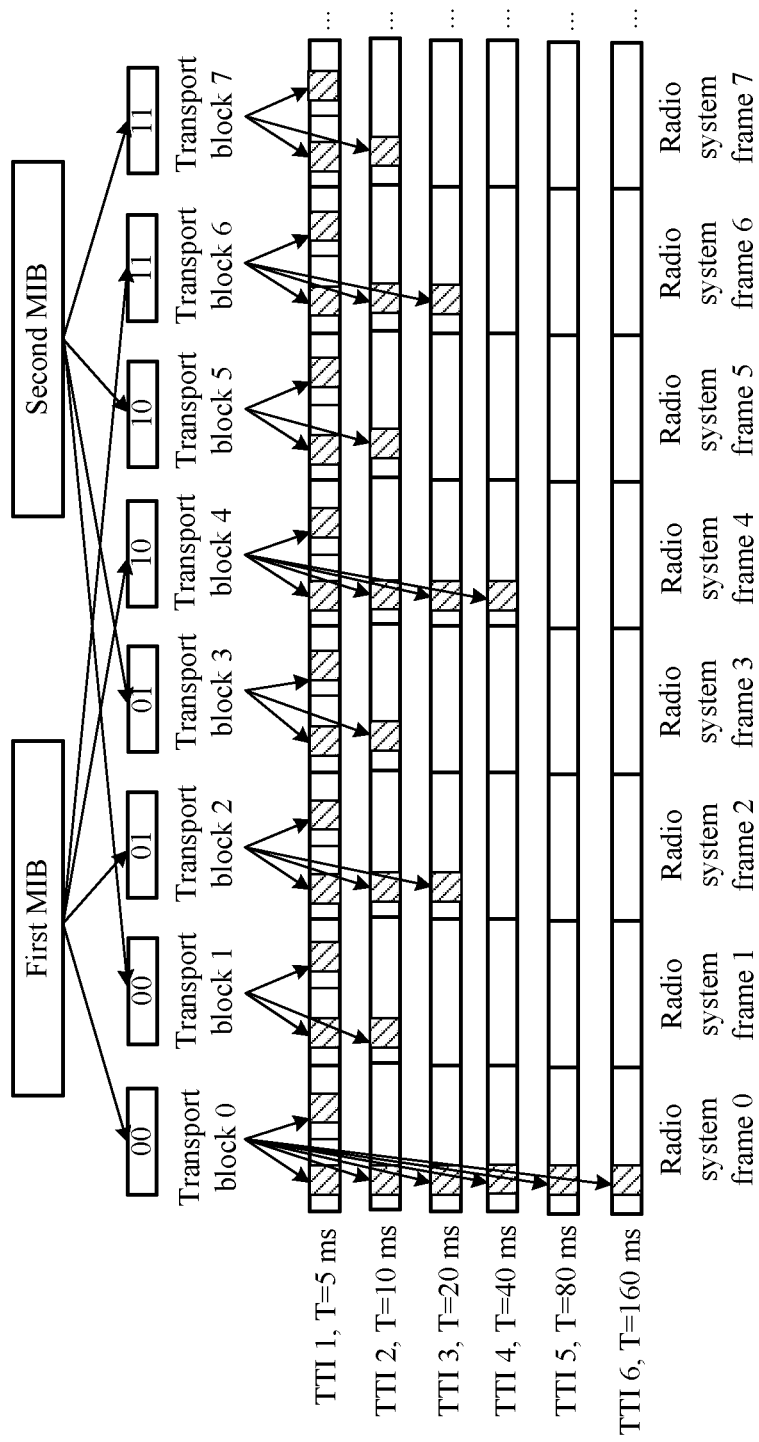
FIG. 3 is a schematic flowchart of another communication method according to an embodiment of this application

FIG. 3 shows 6 TTIs of a PBCH (such as a TTI 1, a TTI 2, a TTI 3, a TTI 4, a TTI 5, and a TTI 6 that are shown in FIG. 3). Each TTI has a length of 80 ms and includes 8 radio system frames (such as a radio system frame 0 to a radio system frame 7 shown in FIG. 3). For example, a period of an SS burst set in the TTI 1 is 5 ms, a period of an SS burst set in the TTI 2 is 10 ms, a period of an SS burst set in the TTI 3 is 20 ms, a period of an SS burst set in the TTI 4 is 40 ms, a period of an SS burst set in the TTI 5 is 80 ms, and a period of an SS burst set in the TTI 6 is 160 ms.

It should be understood that each of the TTI 1, the TTI 2, the TTI 3, the TTI 4, the TTI 5, and the TTI 6 in this embodiment of this application is a TTI of a PBCH. The base station transmits an SFN in each TTI by using different SS burst sets by using a PBCH. A sequence number of the TTI is only used to distinguish a TTI in which the SFN is transmitted in different periods of the SS burst set. A sequence of the TTI 1 to the TTI 6 is not limited in this embodiment of this application.

It should be understood that, when each TTI includes 8 radio system frames, in each TTI, a radio system frame whose system frame number $n_f$ meets $n_f \bmod 8=0$ is used as an initial radio system frame of a period of an SS burst set in the TTI.

The method for transmitting an SFN in different periods of an SS burst set by using a PBCH is described below in detail.

(1) In the TTI 2, the period of the SS burst set is 10 ms, and the base station separately transmits the system frame number of the radio system frame in the radio system frame 0 to the radio system frame 7 by sending a PBCH.

For example, a system frame number of the radio system frame 0 is 0000000000, a system frame number of the radio system frame 1 is 0000000001, a system frame number of the radio system frame 2 is 0000000010, a system frame number of the radio system frame 3 is 0000000011, a system frame number of the radio system frame 4 is 0000000100, a system frame number of the radio system frame 5 is 0000000101, a system frame number of the radio system frame 6 is 0000000110, and a system frame number of the radio system frame 7 is 0000000111.

The least 1 bit is the same and is 0, and the highest 7 bits are also the same among system frame numbers of the radio system frame 0, the radio system frame 2, the radio system frame 4, and the radio system frame 6. Therefore, the base station transmits remaining bits (the least 1 bit and the highest 7 bits) of the system frame number by using the first MIB, to ensure that a same first MIB is transmitted in each radio system frame. The first processing manner is used to implicitly indicate the some bits (the $2^{nd}$ and $3^{rd}$ least bits) of the system frame number.

The least bit is the same and is 1, and the highest 7 bits are also the same among the system frame numbers of the radio system frame 1, the radio system frame 3, the radio system frame 5, and the radio system frame 7. Therefore, the base station transmits remaining bits (the least bit and the highest 7 bits) of the system frame number by using the second MIB, to ensure that a same second MIB is transmitted in each radio system frame. The first processing manner is used to implicitly indicate the some bits (the $2^{nd}$ and $3^{rd}$ least bits) of the system frame number.

In an optional embodiment, the base station may separately process the first MIB in different processing manners, to obtain a transport block (such as a transport block 0, a transport block 2, a transport block 4, or a transport block 6 in FIG. 3) corresponding to each processing manner. The first MIB includes the remaining bits (the remaining bits are the highest 7 bits and the least bit, and the least bit is 0) of the system frame number. The processing manner is used to implicitly indicate the some bits (the $2^{nd}$ and $3^{rd}$ least bits) of the system frame number.

In an optional embodiment, the base station may separately process the second MIB in different processing manners, to obtain a transport block (such as a transport block 1, a transport block 3, a transport block 5, or a transport block 7 in FIG. 3) corresponding to each processing manner. The second MIB includes the remaining bits (the remaining bits are the highest 7 bits and the least bit, and the least bit is 1) of the system frame number. The processing manner is used to implicitly indicate the some bits (the $2^{nd}$ and $3^{rd}$ least bits) of the system frame number.

Specifically, based on the least bit, which is transmitted by using the first MIB, of the system frame number, the least bit, which is transmitted by using the second MIB, of the system frame number, and the $2^{nd}$ and $3^{rd}$ least bits of the system frame number that are implicitly indicated in the first processing manner, the base station may determine the least 3 bits of the system frame number of the radio system frame, and a mapping relationship between the least 3 bits of the system frame number of the radio system frame and a transport block sent in the radio system frame.

For example, the least 3 bits of the system frame number of the radio system frame 0 are 000, and correspond to the transport block 0; the least 3 bits of the system frame number of the radio system frame 1 are 001, and correspond to the transport block 1; the least 3 bits of the system frame number of the radio system frame 2 are 010, and correspond to the transport block 2; the least 3 bits of the system frame number of the radio system frame 3 are 011, and correspond to the transport block 3; the least 3 bits of the system frame number of the radio system frame 4 are 100, and correspond to the transport block 4; the least 3 bits of the system frame number of the radio system frame 5 are 101, and correspond to the transport block 5; the least 3 bits of the system frame number of the radio system frame 6 are 110, and correspond to the transport block 6; and the least 3 bits of the system frame number of the radio system frame 7 are 111, and correspond to the transport block 7.

Therefore, the base station sends the transport block 0 in the radio system frame 0 by using a PBCH, the transport block 1 in the radio system frame 1 by using a PBCH, the transport block 2 in the radio system frame 2 by using a PBCH, the transport block 3 in the radio system frame 3 by using a PBCH, the transport block 4 in the radio system frame 4 by using a PBCH, the transport block 5 in the radio system frame 5 by using a PBCH, the transport block 6 in the radio system frame 6 by using a PBCH, and the transport block 7 in the radio system frame 7 by using a PBCH.

(2) In the TTI 3, the period of the SS burst set is 20 ms, and the base station separately transmits the SFN in the radio system frame 0, the radio system frame 2, the radio system frame 4, and the radio system frame 6 by using a PBCH.

Specifically, based on the least bit, which is transmitted by using the first MIB, of the system frame number, and the $2^{nd}$ and $3^{rd}$ least bits of the system frame number that are implicitly indicated in different manners included in the first processing manner, the base station may determine the least 3 bits of the system frame number of the radio system frame, and a mapping relationship between the least 3 bits of the system frame number of the radio system frame and a transport block sent in the radio system frame.

For example, the least 3 bits of the system frame number of the radio system frame 0 are 000, and correspond to a transport block 0; the least 3 bits of the system frame number of the radio system frame 2 are 010, and correspond to a transport block 2; the least 3 bits of the system frame number of the radio system frame 4 are 100, and correspond to a transport block 4; and the least 3 bits of the system frame number of the radio system frame 6 are 110, and correspond to a transport block 6.

Therefore, the base station sends the transport block 0 in the radio system frame 0 by using a PBCH, the transport block 2 in the radio system frame 2 by using a PBCH, the transport block 4 in the radio system frame 4 by using a PBCH, and the transport block 6 in the radio system frame 6 by using a PBCH.

It should be understood that when the period of the SS burst set is 20 ms, the method for transmitting an SFN in the radio system frame 0, the radio system frame 2, the radio system frame 4, and the radio system frame 6 by using a PBCH is the same as the method for transmitting an SFN in the radio system frame 0, the radio system frame 2, the radio system frame 4, and the radio system frame 6 by using a PBCH when the period of the SS burst set is 10 ms.

It is assumed that in the TTI 2, the period of the SS burst set is a first period (for example, 10 ms). If the system frame number of the radio system frame in which the first PBCH is located is 0011010<u>001</u> (to be specific, the radio system frame 1 in the TTI 2), the base station processes the first MIB in the first processing manner, to obtain the first transport block. The first processing manner is used to indicate the $2^{nd}$ and $3^{rd}$ least bits (for example, the underlined two bits) of the system frame number of the radio system frame in which the first PBCH is located. The first MIB includes 00110101 (the highest 7 bits and the least bit) of the system frame number of the radio system frame in which the first PBCH is located.

It is assumed that in the TTI 3, the period of the SS burst set is a second period (for example, 20 ms). If the system frame number of the radio system frame in which the second PBCH is located is 0110110<u>001</u> (to be specific, the radio system frame 1 in the TTI 3), the base station processes the second MIB in a second processing manner, to obtain the second transport block. The second processing manner is used to indicate the $2^{nd}$ and $3^{rd}$ least bits (for example, the underlined two bits) of the system frame number of the radio system frame in which the second PBCH is located. The second MIB includes 01101101 (the highest 7 bits and the least bit) of the system frame number of the radio system frame in which the second PBCH is located. If the system frame number of the radio system frame in which the second PBCH is located is 0110110<u>010</u> (to be specific, the radio system frame 2 in the TTI 3), the base station processes the second MIB in a second processing manner, to obtain the second transport block. The second processing manner is used to indicate the $2^{nd}$ and $3^{rd}$ least bits (for example, the underlined two bits) of the system frame number of the radio system frame in which the second PBCH is located. The second MIB includes 01101100 (the highest 7 bits and the least bit) of the system frame number of the radio system frame in which the second PBCH is located.

Therefore, regardless of whether system frame numbers transmitted by using a PBCH in different periods are the same or different, the base station may transmit the SFNs by using a PBCH by using a uniform method. Therefore, complexity of the base station and UE can be reduced.

(3) In the TTI 4, the period of the SS burst set is 40 ms, and the base station separately transmits the SFN in the radio system frame 0 and the radio system frame 4 by using a PBCH.

Specifically, based on the least bit, which is transmitted by using the first MIB, of the system frame number, and the $2^{nd}$ and $3^{rd}$ least bits of the system frame number that are implicitly indicated in different manners included in the first processing manner, the base station may determine the least 3 bits of the system frame number of the radio system frame, and a mapping relationship between the least 3 bits of the system frame number of the radio system frame and a transport block sent in the radio system frame.

For example, the least 3 bits of the system frame number of the radio system frame 0 are 000, and correspond to a transport block 0; and the least 3 bits of the system frame number of the radio system frame 4 are 100, and correspond to a transport block 4.

Therefore, the base station sends the transport block 0 in the radio system frame 0 by using a PBCH, and the transport block 4 in the radio system frame 4 by using a PBCH.

It should be understood that the method for transmitting an SFN in the radio system frame 0 and the radio system frame 4 by using a PBCH when the period of the SS burst set is 40 ms is the same as the method for transmitting an SFN in the radio system frame 0 and the radio system frame 4 by using a PBCH when the period of the SS burst set is 10 ms. To avoid repetition, details are not described herein again.

(4) In the TTI 5, the period of the SS burst set is 80 ms, and the base station transmits the SFN in the radio system frame 0 by using a PBCH.

Specifically, based on the least bit, which is transmitted by using the first MIB, of the system frame number, and the $2^{nd}$ and $3^{rd}$ least bits of the system frame number that are implicitly indicated in different manners included in the first processing manner, the base station may determine the least 3 bits of the system frame number of the radio system frame, and a mapping relationship between the least 3 bits of the system frame number of the radio system frame and a transport block sent in the radio system frame.

For example, the least 3 bits of the system frame number of the radio system frame 0 are 000, and correspond to a transport block 0. The base station sends the transport block 0 in the radio system frame 0 by using a PBCH.

(5) In the TTI 6, the period of the SS burst set is 160 ms, and the base station transmits the SFN in the radio system frame 0 by using a PBCH, and a next SFN, by using a PBCH, in another subsequent TTI that is spaced from the TTI 6 by another TTI.

Specifically, based on the least bit, which is transmitted by using the first MIB, of the system frame number, and the $2^{nd}$ and $3^{rd}$ least bits of the system frame number that are implicitly indicated in different manners included in the first processing manner, the base station may determine the least 3 bits of the system frame number of the radio system frame, and a mapping relationship between the least 3 bits of the system frame number of the radio system frame and a transport block sent in the radio system frame.

For example, the least 3 bits of the system frame number of the radio system frame 0 are 000, and correspond to a transport block 0. The base station sends the transport block 0 in the radio system frame 0 by using a PBCH.

It should be understood that the method for transmitting an SFN in the radio system frame 0 by using a PBCH when the period of the SS burst set is 160 ms is the same as the method for transmitting an SFN in the radio system frame 0 by using a PBCH when the period of the SS burst set is 10 ms. To avoid repetition, details are not described herein again.

(6) In the TTI 1, the period of the SS burst set is 5 ms, and the base station transmits the SFN in the radio system frame 0 to the radio system frame 7 by using a PBCH, and transmits two SSBs in each radio system frame. To be specific, the two SSBs are respectively transmitted in a first half-frame and a second half-frame. Both the SSBs transmitted in the first half-frame and the second half-frame may include the PBCH, or only one SSB includes the PBCH. Because both the first half-frame and the second half-frame are located in the same radio system frame, an SFN in the SSB transmitted in the first half-frame is the same as an SFN in the SSB transmitted in the second half-frame.

It should be understood that the method for transmitting an SFN in the radio system frame 0 to the radio system frame 7 by using a PBCH when the period of the SS burst set is 5 ms is the same as the method for transmitting an SFN in the radio system frame 0 to the radio system frame 7 by using a PBCH when the period of the SS burst set is 10 ms. To avoid repetition, details are not described herein again.

It should be understood that the base station may configure a plurality of periods of an SS burst set. In other words, different periods of the SS burst set are used in different TTIs. The plurality of periods of the SS burst set may be, for example, two or more periods of 5 ms, 10 ms, 20 ms, 40 ms, 80 ms, and 160 ms of the SS burst set. This is not limited in this embodiment of this application.

In the communication method provided in this embodiment of this application, in the two or more different periods of the SS burst set, the base station does not need a corresponding SFN transmission method in each period of the SS burst set, but transmits the highest 7 bits and the least bit of the system frame number by using the first MIB, and the first processing manner used to process the first MIB implicitly indicates the $2^{nd}$ and $3^{rd}$ least bits of the system frame number. Therefore, computational complexity of the base station and UE can be reduced, and complexity of detecting an SFN by the UE is reduced.

Optionally, the first processing manner may indicate some bit positions and bits in the some bit positions.

In an optional embodiment, as shown in FIG. 3, in the TTI 2, the period of the SS burst set is 10 ms, and the base station separately transmits the system frame number of the radio system frame in the radio system frame 0 to the radio system frame 7 by sending a PBCH.

For example, a system frame number of the radio system frame 0 is 0000000000, a system frame number of the radio system frame 1 is 0000000001, a system frame number of the radio system frame 2 is 0000000010, a system frame number of the radio system frame 3 is 0000000011, a system frame number of the radio system frame 4 is 0000000100, a system frame number of the radio system frame 5 is 0000000101, a system frame number of the radio system frame 6 is 0000000110, and a system frame number of the radio system frame 7 is 0000000111.

The least bit is the same and is 0, and the highest 7 bits are also the same among the system frame numbers of the radio system frame 0, the radio system frame 2, the radio system frame 4, and the radio system frame 6. Therefore, the base station transmits remaining bits (the least bit and the highest 7 bits) of the system frame number by using the first MIB, to ensure that a same first MIB is transmitted in each radio system frame. The first processing manner is used to implicitly indicate the some bits (the $2^{nd}$ and $3^{rd}$ least bits) of the system frame number.

The least bit is the same and is 1, and the highest 7 bits are also the same among the system frame numbers of the radio system frame 1, the radio system frame 3, the radio system frame 5, and the radio system frame 7. Therefore, the base station transmits remaining bits (the least bit and the highest 7 bits) of the system frame number by using the second MIB, to ensure that a same second MIB is transmitted in each radio system frame. The first processing manner is used to implicitly indicate the some bits (the $2^{nd}$ and $3^{rd}$ least bits) of the system frame number.

In an optional embodiment, the base station may separately process the first MIB in 4 different processing manners, to obtain a transport block (such as a transport block 0, a transport block 2, a transport block 4, or a transport block 6 in FIG. 3) corresponding to each processing manner. The first MIB carries the remaining bits (the remaining bits are the highest 7 bits and the least bit, and the least bit is 0) of the system frame number. The processing manner is used to implicitly indicate the some bits (the $2^{nd}$ and $3^{rd}$ least bits) of the system frame number.

For example, some bits implicitly indicated in a processing manner 0 used by the transport block 0 are 00, some bits implicitly indicated in a processing manner 2 used by the transport block 2 are 01, some bits implicitly indicated in a processing manner 4 used by the transport block 4 are 10, and some bits implicitly indicated in a processing manner 6 used by the transport block 6 are 11.

In an optional embodiment, the base station may separately process the second MIB in 4 different processing manners, to obtain a transport block (such as a transport block 1, a transport block 3, a transport block 5, or a transport block 7 in FIG. 3) corresponding to each processing manner. The second MIB carries the remaining bits (the remaining bits are the highest 7 bits and the least bit, and the least bit is 1) of the system frame number. The processing manner is used to implicitly indicate the some bits (the $2^{nd}$ and $3^{rd}$ least bits) of the system frame number.

For example, some bits implicitly indicated in a processing manner 1 used by the transport block 1 are 00, some bits implicitly indicated in a processing manner 3 used by the transport block 3 are 01, some bits implicitly indicated in a processing manner 5 used by the transport block 5 are 10, and some bits implicitly indicated in a processing manner 7 used by the transport block 7 are 11.

Optionally, because both the processing manners used by the transport block 0 and the transport block 1 implicitly indicate that the some bits of the system frame numbers are 00, the processing manner 0 used by the transport block 0 may be the same as the processing manner 1 used by the transport block 1. Similarly, the processing manner 2 used by the transport block 2 may be the same as the processing manner 3 used by the transport block 3, the processing manner 4 used by the transport block 4 may be the same as the processing manner 5 used by the transport block 5, and the processing manner 6 used by the transport block 6 may be the same as the processing manner 7 used by the transport block 7.

For example, when the first processing manner is scrambling, the base station may scramble the first MIB in a scrambling manner 1, to obtain the transport block 0, and scramble the second MIB in the scrambling manner 1, to obtain the transport block 1, where the scrambling manner 1 is used to implicitly indicate that the some bits are 00; the base station may scramble the first MIB in a scrambling manner 2, to obtain the transport block 2, and scramble the second MIB in the scrambling manner 2, to obtain the transport block 3, where the scrambling manner 2 is used to implicitly indicate that the some bits are 01; the base station may scramble the first MIB in a scrambling manner 3, to obtain the transport block 4, and scramble the second MIB in the scrambling manner 3, to obtain the transport block 5, where the scrambling manner 3 is used to implicitly indicate that the some bits are 10; and the base station may scramble the first MIB in a scrambling manner 4, to obtain the transport block 6, and scramble the second MIB in the scrambling manner 4, to obtain the transport block 7, where the scrambling manner 4 is used to implicitly indicate that the some bits are 11.

In this way, the base station processes the first MIB in 4 processing manners, to obtain the transport block 0, the transport block 2, the transport block 4, and the transport block 6, and processes the second MIB in the same 4 processing manners, to obtain the transport block 1, the transport block 3, the transport block 5, and the transport block 7. Therefore, computational complexity of the base station is reduced.

Accordingly, the UE needs to perform blind detection on a received transport block in only 4 scrambling manners. If it is detected that the transport block uses the processing manner 0, it can be determined that the some bits are 00. If it is detected that the transport block uses the processing manner 2, it can be determined that the some bits are 01. If it is detected that the transport block uses the processing manner 4, it can be determined that the some bits are 10. If it is detected that the transport block uses the processing manner 6, it can be determined that the some bits are 11. Therefore, detection complexity of the UE is reduced.

Specifically, based on the least bit, which is transmitted by using the first MIB, of the system frame number, the least bit, which is transmitted by using the second MIB, of the system frame number, and the $2^{nd}$ and $3^{rd}$ least bits of the system frame number that are implicitly indicated in the first processing manner, the base station may determine the least 3 bits of the system frame number of the radio system frame, and a mapping relationship between the least 3 bits of the system frame number of the radio system frame and a transport block sent in the radio system frame.

For example, the least 3 bits of the system frame number of the radio system frame 0 are 000, and correspond to the transport block 0; the least 3 bits of the system frame number of the radio system frame 1 are 001, and correspond to the transport block 1; the least 3 bits of the system frame number of the radio system frame 2 are 010, and correspond to the transport block 2; the least 3 bits of the system frame number of the radio system frame 3 are 011, and correspond to the transport block 3; the least 3 bits of the system frame number of the radio system frame 4 are 100, and correspond to the transport block 4; the least 3 bits of the system frame number of the radio system frame 5 are 101, and correspond to the transport block 5; the least 3 bits of the system frame number of the radio system frame 6 are 110, and correspond to the transport block 6; and the least 3 bits of the system frame number of the radio system frame 7 are 111, and correspond to the transport block 0.

Therefore, the base station sends the transport block 0 in the radio system frame 0 by using a PBCH, the transport block 1 in the radio system frame 1 by using a PBCH, the transport block 2 in the radio system frame 2 by using a PBCH, the transport block 3 in the radio system frame 3 by using a PBCH, the transport block 4 in the radio system frame 4 by using a PBCH, the transport block 5 in the radio system frame 5 by using a PBCH, the transport block 6 in the radio system frame 6 by using a PBCH, and the transport block 7 in the radio system frame 7 by using a PBCH.

Optionally, the some bits in this embodiment of this application may be the least 3 bits. When a length of the system frame number of the radio system frame is 10 bits, the base station may process the first MIB in the first processing manner, to obtain the first transport block. The first processing manner is used to implicitly indicate the some bits (to be specific, the least 3 bits) of the system frame number of the radio system frame. The first MIB includes the remaining bits (to be specific, the highest 7 bits), other than the some bits, of the system frame number of the radio system frame.

Accordingly, the highest 7 bits (for example, the highest 7 bits of the SFN) of the system frame number of the radio system frame are indicated to the UE on the PBCH, and the least 3 bits (for example, the least 3 bits of the SFN) of the system frame number of the radio system frame are implicitly indicated to the UE by decoding the first processing manner of the PBCH.

For convenience of description, in this embodiment of this application, the bits in the some bit positions are collectively referred to as some bits, and a bit, other than the some bits, of the system frame number is collectively referred to as a remaining bit.

A method for transmitting an SFN by a base station in a same processing manner (the least 3 bits of the system frame number are implicitly indicated in the first processing manner) in different periods of an SS burst set by using a PBCH is described below in detail with reference to FIG. 4.

Figure 4:
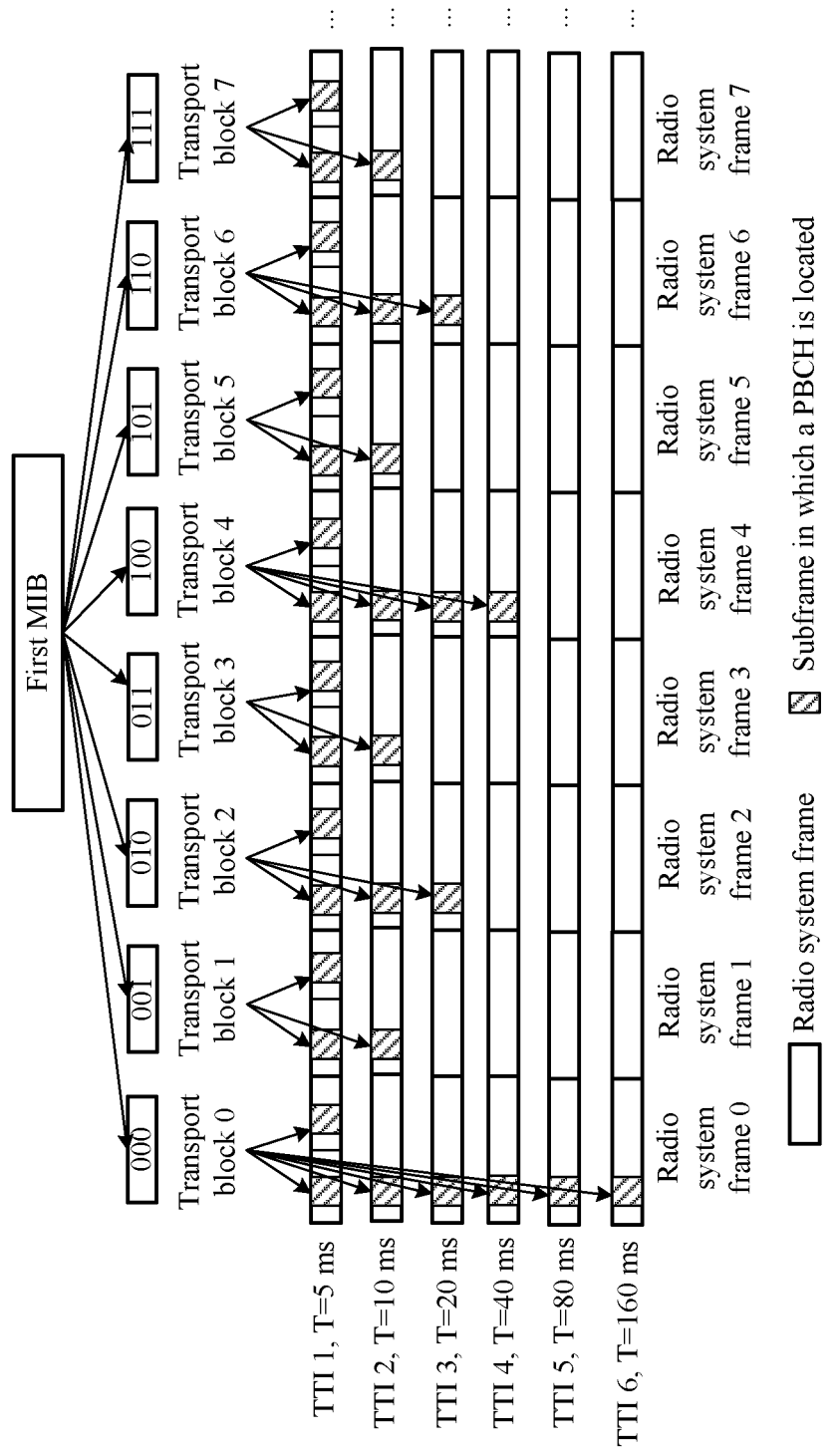
FIG. 4 is a schematic flowchart of another communication method according to an embodiment of this application.

FIG. 4 shows 6 TTIs of a PBCH (such as a TTI 1, a TTI 2, a TTI 3, a TTI 4, a TTI 5, and a TTI 6 that are shown in FIG. 4). Each TTI has a length of 80 ms, and includes 8 radio system frames (such as a radio system frame 0 to a radio system frame 7 shown in FIG. 4). For example, a period of an SS burst set in the TTI 1 is 5 ms, a period of an SS burst set in the TTI 2 is 10 ms, a period of an SS burst set in the TTI 3 is 20 ms, a period of an SS burst set in the TTI 4 is 40 ms, a period of an SS burst set in the TTI 5 is 80 ms, and a period of an SS burst set in the TTI 6 is 160 ms.

It should be understood that each of the TTI 1, the TTI 2, the TTI 3, the TTI 4, the TTI 5, and the TTI 6 in this embodiment of this application is a TTI of any PBCH. The base station transmits an SFN in each TTI by using different SS burst sets by using a PBCH. A sequence number of the TTI is only used to distinguish a TTI in which the SFN is transmitted in different periods of the SS burst set. A sequence of the TTI 1 to the TTI 6 is not limited in this embodiment of this application.

It should be understood that, when each TTI includes 8 radio system frames, in each TTI, a radio system frame whose system frame number $n_f$ meets $n_f \bmod 8 = 0$ is used as an initial radio system frame of a period of an SS burst set in the TTI.

The method for transmitting an SFN in different periods of an SS burst set by using a PBCH is described below in detail.

(1) In the TTI 2, the period of the SS burst set is 10 ms, and the base station separately transmits the system frame number of the radio system frame in the radio system frame 0 to the radio system frame 7 by sending a PBCH.

For example, a system frame number of the radio system frame 0 is 0000000000, a system frame number of the radio system frame 1 is 0000000001, a system frame number of the radio system frame 2 is 0000000010, a system frame number of the radio system frame 3 is 0000000011, a system frame number of the radio system frame 4 is 0000000100, a system frame number of the radio system frame 5 is 0000000101, a system frame number of the radio system frame 6 is 0000000110, and a system frame number of the radio system frame 7 is 0000000111.

In system frame numbers of the radio system frame 0 to the radio system frame 7, the highest 7 bits are the same. Therefore, the base station transmits remaining bits (the highest 7 bits) of the system frame number by using the first MIB, to ensure that a same first MIB is transmitted in each radio system frame. The first processing manner is used to implicitly indicate the some bits (the least 3 bits) of the system frame number.

In an optional embodiment, the base station may separately process the first MIB in 8 different processing manners, to obtain a transport block (such as a transport block 0 to a transport block 7 in FIG. 4) corresponding to each processing manner. The first MIB includes the remaining bits (the highest 7 bits) of the system frame number. The processing manner is used to implicitly indicate the some bits (the least 3 bits) of the system frame number.

Specifically, based on the least 3 bits of the system frame number that are implicitly indicated in the first processing manner, the base station may determine a mapping relationship between the least 3 bits of the system frame number of the radio system frame and a transport block sent in the radio system frame.

For example, the least 3 bits of the system frame number of the radio system frame 0 are 000, and correspond to a transport block 0; the least 3 bits of the system frame number of the radio system frame 1 are 001, and correspond to a transport block 1; the least 3 bits of the system frame number of the radio system frame 2 are 010, and correspond to a transport block 2; the least 3 bits of the system frame number of the radio system frame 3 are 011, and correspond to a transport block 3; the least 3 bits of the system frame number of the radio system frame 4 are 100, and correspond to a transport block 4; the least 3 bits of the system frame number of the radio system frame 5 are 101, and correspond to a transport block 5; the least 3 bits of the system frame number of the radio system frame 6 are 110, and correspond to a transport block 6; and the least 3 bits of the system frame number of the radio system frame 7 are 111, and correspond to the transport block 0.

Therefore, the base station sends the transport block 0 in the radio system frame 0 by using a PBCH, the transport block 1 in the radio system frame 1 by using a PBCH, the transport block 2 in the radio system frame 2 by using a PBCH, the transport block 3 in the radio system frame 3 by using a PBCH, the transport block 4 in the radio system frame 4 by using a PBCH, the transport block 5 in the radio system frame 5 by using a PBCH, the transport block 6 in the radio system frame 6 by using a PBCH, and the transport block 7 in the radio system frame 7 by using a PBCH.

In the communication method provided in this embodiment of this application, the least 3 bits of the system frame number are implicitly indicated in the first processing manner. Therefore, a transmitted data volume can be reduced, and transmission efficiency is increased.

(2) In the TTI 3, the period of the SS burst set is 20 ms, and the base station separately transmits the SFN in the radio system frame 0, the radio system frame 2, the radio system frame 4, and the radio system frame 6 by using a PBCH.

Specifically, based on the least 3 bits of the system frame number that are implicitly indicated in the first processing manner, the base station may determine a mapping relationship between the least 3 bits of the system frame number of the radio system frame and a transport block sent in the radio system frame.

For example, the least 3 bits of the system frame number of the radio system frame 0 are 000, and correspond to a transport block 0; the least 3 bits of the system frame number of the radio system frame 2 are 010, and correspond to a transport block 2; the least 3 bits of the system frame number of the radio system frame 4 are 100, and correspond to a transport block 4; and the least 3 bits of the system frame number of the radio system frame 6 are 110, and correspond to a transport block 6.

Therefore, the base station sends the transport block 0 in the radio system frame 0 by using a PBCH, the transport block 2 in the radio system frame 2 by using a PBCH, the transport block 4 in the radio system frame 4 by using a PBCH, and the transport block 6 in the radio system frame 6 by using a PBCH.

It should be understood that the method for transmitting an SFN in the radio system frame 0, the radio system frame 2, the radio system frame 4, and the radio system frame 6 by using a PBCH when the period of the SS burst set is 20 ms is the same as the method for transmitting an SFN in the radio system frame 0, the radio system frame 2, the radio system frame 4, and the radio system frame 6 by using a PBCH when the period of the SS burst set is 10 ms.

It is assumed that in the TTI 2, the period of the SS burst set is a first period (for example, 10 ms). If the system frame number of the radio system frame in which the first PBCH is located is 0011010<u>001</u> (to be specific, the radio system frame 1 in the TTI 2), the base station processes the first MIB in the first processing manner, to obtain the first transport block. The first processing manner is used to indicate the least 3 bits (for example, the underlined 3 bits) of the system frame number of the radio system frame in which the first PBCH is located. The first MIB includes 0011010 (the highest 7 bits) of the system frame number of the radio system frame in which the first PBCH is located.

It is assumed that in the TTI 3, the period of the SS burst set is a second period (for example, 20 ms). If the system frame number of the radio system frame in which the second PBCH is located is 0110110<u>001</u> (to be specific, the radio system frame 1 in the TTI 3), the base station processes the second MIB in a second processing manner, to obtain the second transport block. The second processing manner is used to indicate the least 3 bits (for example, the underlined 3 bits) of the system frame number of the radio system frame in which the second PBCH is located. The second MIB includes 0110110 (the highest 7 bits) of the system frame number of the radio system frame in which the second PBCH is located. If the system frame number of the radio system frame in which the second PBCH is located is 0110110<u>010</u> (to be specific, the radio system frame 2 in the TTI 3), the base station processes the second MIB in a second processing manner, to obtain the second transport block. The second processing manner is used to indicate the least 3 bits (for example, the underlined 3 bits) of the system frame number of the radio system frame in which the second PBCH is located. The second MIB includes 0110110 (the highest 7 bits) of the system frame number of the radio system frame in which the second PBCH is located.

Therefore, regardless of whether system frame numbers transmitted by using a PBCH in different periods are the same or different, the base station may transmit the SFNs by using a PBCH by using a uniform method. Therefore, complexity of the base station and UE can be reduced.

(3) In the TTI 4, the period of the SS burst set is 40 ms, and the base station separately transmits the SFN in the radio system frame 0 and the radio system frame 4 by using a PBCH.

Specifically, based on the least 3 bits of the system frame number that are implicitly indicated in the first processing manner, the base station may determine a mapping relationship between the least 3 bits of the system frame number of the radio system frame and a transport block sent in the radio system frame.

For example, the least 3 bits of the system frame number of the radio system frame 0 are 000, and correspond to a transport block 0; and the least 3 bits of the system frame number of the radio system frame 4 are 100, and correspond to a transport block 4.

Therefore, the base station sends the transport block 0 in the radio system frame 0 by using a PBCH, and the transport block 4 in the radio system frame 4 by using a PBCH.

It should be understood that the method for transmitting an SFN in the radio system frame 0 and the radio system frame 4 by using a PBCH when the period of the SS burst set is 40 ms is the same as the method for transmitting an SFN in the radio system frame 0 and the radio system frame 4 by using a PBCH when the period of the SS burst set is 10 ms. To avoid repetition, details are not described herein again.

(4) In the TTI 5, the period of the SS burst set is 80 ms, and the base station transmits the SFN in the radio system frame 0 by using a PBCH.

Specifically, based on the least 3 bits of the system frame number that are implicitly indicated in the first processing manner, the base station may determine a mapping relationship between the least 3 bits of the system frame number of the radio system frame and a transport block sent in the radio system frame.

For example, the least 3 bits of the system frame number of the radio system frame 0 are 000, and correspond to a transport block 0. The base station sends the transport block 0 in the radio system frame 0 by using a PBCH.

It should be understood that the method for transmitting an SFN in the radio system frame 0 by using a PBCH when the period of the SS burst set is 80 ms is the same as the method for transmitting an SFN in the radio system frame 0 by using a PBCH when the period of the SS burst set is 10 ms. To avoid repetition, details are not described herein again.

(5) In the TTI 6, the period of the SS burst set is 160 ms, and the base station transmits the SFN in the radio system frame 0 by using a PBCH, and a next SFN, by using a PBCH, in another subsequent TTI that is spaced from the TTI 6 by another TTI.

Specifically, the base station may process the first MIB in the first processing manner, to obtain the first transport block. The first processing manner implicitly indicates the PBCH.

For example, the least 3 bits of the system frame number of the radio system frame 0 are 000, and correspond to a transport block 0. The base station sends the transport block 0 in the radio system frame 0 by using a PBCH.

It should be understood that the method for transmitting an SFN in the radio system frame 0 by using a PBCH when the period of the SS burst set is 160 ms is the same as the method for transmitting an SFN in the radio system frame 0 by using a PBCH when the period of the SS burst set is 10 ms. To avoid repetition, details are not described herein again.

(6) In the TTI 1, the period of the SS burst set is 5 ms, and the base station transmits the SFN in the radio system frame 0 to the radio system frame 7 by using a PBCH, and transmits SSBs in each radio system frame. To be specific, the SSBs are transmitted in a first half-frame and a second half-frame, respectively. Both the SSB transmitted in the first half-frame and the SSB transmitted in the second half-frame may include the PBCH, or only one SSB includes the PBCH. Because both the first half-frame and the second half-frame are located in the same radio system frame, an SFN in the SSB transmitted in the first half-frame is the same as an SFN in the SSB transmitted in the second half-frame.

It should be understood that the method for transmitting an SFN in the radio system frame 0 to the radio system frame 7 by using a PBCH when the period of the SS burst set is 5 ms is the same as the method for transmitting an SFN in the radio system frame 0 to the radio system frame 7 by using a PBCH when the period of the SS burst set is 10 ms. To avoid repetition, details are not described herein again.

In the communication method provided in this embodiment of this application, in two or more different periods of an SS burst set, the base station does not need a corresponding SFN transmission method in each period of the SS burst set, but transmits the highest 7 bits of the system frame number by using the first MIB, and the first processing manner used to process the first MIB implicitly indicates the least 3 bits of the system frame number. Therefore, computational complexity of the base station and UE can be reduced, and complexity of detecting an SFN by the UE is reduced.

Optionally, when the period of the SS burst set is half a length of the radio system frame in which the SS burst set is located, the base station needs to send two SSBs in one radio system frame, to be specific, send one SSB in a first half-frame and/or one SSB in a second half-frame. Therefore, the base station needs to indicate half-frame information of the SSB to the UE. The half-frame information is used to indicate that the SSB is sent in the first half-frame or the second half-frame.

Optionally, the base station may indicate the half-frame information in a plurality of manners. This is not limited in this embodiment of this application.

In an optional embodiment, the base station may add 1-bit indication information to the transport block obtained by processing the first MIB in the first processing manner, to indicate the half-frame information.

For example, a bit value of the 1 bit is 0, and the SSB is correspondingly sent in the first half-frame. A bit value of the 1 bit is 1, and the SSB is correspondingly sent in the second half-frame.

In an optional embodiment, the base station may indicate the half-frame information by using different demodulation reference signal (DMRS) sequences, or may indicate the half-frame information by using different frequency offsets of DMRS sequences.

For example, the base station and the UE may agree in advance to indicate, by using a first DMRS sequence, that the SSB is sent in the first half-frame, and to indicate, by using a second DMRS sequence, that the SSB is sent in the second half-frame.

For another example, the base station and the UE may agree in advance to indicate, by using a first frequency offset of a first DMRS sequence, that the SSB is sent in the first half-frame, and to indicate, by using a second frequency offset of the first DMRS sequence, that the SSB is sent in the second half-frame.

Optionally, the UE and the base station may agree, in accordance with a protocol, on a correspondence between the half-frame information and a DMRS sequence and/or a frequency offset of the DMRS sequence. Alternatively, the base station may indicate a correspondence between the half-frame information and a DMRS sequence and/or a frequency offset of the DMRS sequence to the UE by using higher layer signaling. This is not limited in this embodiment of this application.

In an optional embodiment, the base station may indicate the half-frame information by using positions of a first symbol and a second symbol that are occupied by a PBCH included by the SSB.

In an optional embodiment, the base station may indicate the half-frame information by using content included in the SSB.

For example, the base station and the UE may agree in advance to indicate, based on whether the SSB includes a PBCH, whether the SSB is sent in the first half-frame or in the second half-frame.

In an optional embodiment, the base station may use a reserved bit in the first MIB, to indicate the half-frame information. Alternatively, the base station may reuse a bit in the first MIB, to indicate the half-frame information. For example, the base station may reuse a bit used to indicate the SSB in the first MIB, or a bit used to indicate the period of the SS burst set in the first MIB. This is not limited in this embodiment of this application.

In the communication method provided in this embodiment of this application, the base station indicates the half-frame information of the SSB in a plurality of different manners, so that the UE can obtain a system frame number with a finer granularity.

Optionally, in each period of the SS burst set, the base station may send an SS burst in only one radio frame, and even in each half frame of the radio frame. For example, each PBCH shown in FIG. 5 and FIG. 4 may be included in one SS burst.

It should be further understood that, in each period of the SS burst set, the base station may send an SS burst in each radio frame, and even in each half frame of each radio frame. All SS bursts in the period of the SS burst set form the SS burst set.

Figure 5:
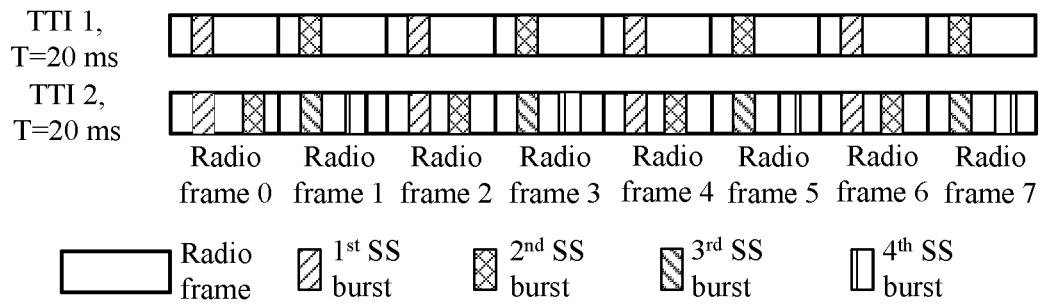
FIG. 5 is a schematic diagram of each radio system frame included in a period of an SS burst set including an SS burst according to an embodiment of this application.

For example, FIG. 5 is a schematic diagram of each radio frame included in a period of an SS burst set including an SS burst. As shown in FIG. 5, a period of an SS burst set in a TTI 1 is 20 ms, and the SS burst set includes two SS bursts (in other words, a $1^{st}$ SS burst and a $2^{nd}$ SS burst). The $1^{st}$ SS burst is sent in a first 10 ms radio frame in the period of 20 ms, and the $2^{nd}$ SS burst is sent in a second 10 ms radio frame in the period of 20 ms. A period of an SS burst set in a TTI 2 is 20 ms. The SS burst set includes 4 SS bursts (in other words, a $1^{st}$ SS burst, a $2^{nd}$ SS burst, a $3^{rd}$ SS burst, and a $4^{th}$ SS burst). The $1^{st}$ SS burst is sent in a first half-frame of a first 10 ms radio frame in the period of 20 ms, the $2^{nd}$ SS burst is sent in a second half-frame of the first 10 ms radio frame in the period of 20 ms, the $3^{rd}$ SS burst is sent in a first half-frame of a second 10 ms radio frame in the period of 20 ms, and the $4^{th}$ SS burst is sent in a second half-frame of the second 10 ms radio frame in the period of 20 ms.

It should be understood that system frame numbers transmitted in an SS burst in one radio frame are the same, and the method for transmitting an SFN by using an SS burst in each radio system frame is similar to the methods for transmitting an SFN in each radio frame by using a PBCH described in FIG. 2 to FIG. 4. To avoid repetition, details are not described herein again.

Figure 6:
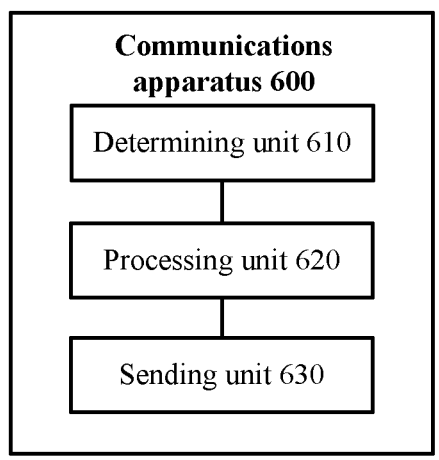
FIG. 6 is a schematic block diagram of a communications apparatus for data transmission according to an embodiment of this application.

FIG. 6 is a schematic block diagram of a communications apparatus 600 for data transmission according to an embodiment of this application. The communications apparatus 600 includes:

a determining unit 610, configured to determine a system frame number of a radio system frame in which a to-be-sent first physical broadcast channel (PBCH) is located, where the first PBCH is included in a first synchronization signal burst set (SS burst set), and a period of the first SS burst set is one of a plurality of periods;

a processing unit 620, configured to process a first master information block (MIB) in a first processing manner, to obtain a first transport block, where the first processing manner is used to indicate some bits of the system frame number, which is determined by the determining unit 610, of the radio system frame in which the first PBCH is located, and the first MIB includes remaining bits, other than the some bits, of the system frame number of the radio system frame in which the first PBCH is located; and a sending unit 630, configured to send, by using the first PBCH, in the radio system frame in which the first PBCH is located, the first transport block obtained through processing by the processing unit 620.

Optionally, the first PBCH is sent in a first transmission time interval (TTI), the period of the first SS burst set is a first period of the plurality of periods in the first TTI, and the determining unit is further configured to determine a system frame number of a radio system frame in which a second PBCH to be sent in a second TTI is located, where the second PBCH is included in a second SS burst set, and a period of the second SS burst set is a second period of the plurality of periods. The processing unit is further configured to process a second MIB in the first processing manner, to obtain a second transport block, where the first processing manner is used to indicate some bits of the system frame number of the radio system frame in which the second PBCH is located, and the second MIB includes remaining bits, other than the some bits, of the system frame number of the radio system frame in which the second PBCH is located. The sending unit is further configured to send, by using the second PBCH, the second transport block in the radio system frame in which the second PBCH is located.

Optionally, the some bits include the $2^{nd}$ and $3^{rd}$ least significant bits.

Optionally, the some bits include the least significant 3 bits.

Optionally, the first processing manner includes at least one of a cyclic redundancy check (CRC), a cyclic shift, and scrambling.

This application provides a communication method and the communications apparatus, so that an SFN can be transmitted in different periods of an SS burst set by using a PBCH.

In addition, in two or more different periods of the SS burst set, a base station does not need a corresponding SFN transmission method in each period of the SS burst set, but transmits the remaining bits of the system frame number by using the first MIB, and the first processing manner used to process the first MIB implicitly indicates the some bits of the system frame number. Therefore, computational complexity of the base station and UE can be reduced, and complexity of detecting an SFN by the UE is reduced.

In an optional example, a person skilled in the art may understand that the communications apparatus 600 may be specifically the network device in the foregoing method embodiment. The communications apparatus 600 may be configured to perform the procedures and/or steps corresponding to the network device in the foregoing method embodiment. To avoid repetition, details are not described herein again.

It should be understood that the communications apparatus 600 herein may be in a form of a functional unit. The term "unit" herein may be an ASIC, an electronic circuit, a processor (such as a shared processor, a dedicated processor, or a group processor) and a memory that are used to execute one or more software programs or firmware programs, a combined logic circuit, and/or another proper component supporting a described function.

Figure 7:
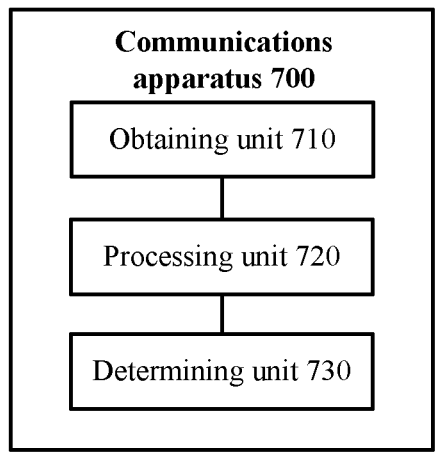
FIG. 7 is a schematic block diagram of another communications apparatus for data transmission according to an embodiment of this application.

FIG. 7 is a schematic block diagram of another communications apparatus 700 for data transmission according to an embodiment of this application. The communications apparatus 700 includes:

an obtaining unit 710, configured to obtain a transport block sent by a network device by using a physical broadcast channel (PBCH), where the PBCH is included in a synchronization signal burst set (SS burst set), and a period of the SS burst set is one of a plurality of periods;

a processing unit 720, configured to process, in a first processing manner, the transport block obtained by the obtaining unit 710, to obtain a master information block (MIB); and obtain, in the processing manner, some bit positions of a system frame number of a radio system frame in which the PBCH is located and bits in the some bit positions, where the MIB includes remaining bits, other than the some bits, of the system frame number of the radio system frame in which the PBCH is located; and a determining unit 730, configured to determine, based on the some bits obtained through processing by the processing unit 720 and the remaining bits, the system frame number of the radio system frame in which the PBCH is located.

Optionally, the some bits include the $2^{nd}$ and $3^{rd}$ least significant bits.

Optionally, the some bits include the least significant 3 bits.

Optionally, the processing manner includes at least one of a cyclic redundancy check (CRC), a cyclic shift, and descrambling.

This application provides a communication method and the communications apparatus, so that an SFN can be transmitted in different periods of an SS burst set by using a PBCH.

In addition, in two or more different periods of the SS burst set, a base station does not need a corresponding SFN transmission method in each period of the SS burst set, but transmits the remaining bits of the system frame number by using the MIB, and the processing manner used to process the MIB implicitly indicates the some bits of the system frame number. Therefore, computational complexity of the base station and UE can be reduced, and complexity of detecting an SFN by the UE is reduced.

In an optional example, a person skilled in the art may understand that the communications apparatus 700 may be specifically the UE in the foregoing method embodiment. The communications apparatus 700 may be configured to perform the procedures and/or steps corresponding to the UE in the foregoing method embodiment. To avoid repetition, details are not described herein again.

It should be understood that the communications apparatus 700 herein may be in a form of a functional unit. The term "unit" herein may be an ASIC, an electronic circuit, a processor (such as a shared processor, a dedicated processor, or a group processor) and a memory that are used to execute one or more software programs or firmware programs, a combined logic circuit, and/or another proper component supporting a described function.

Figure 8:
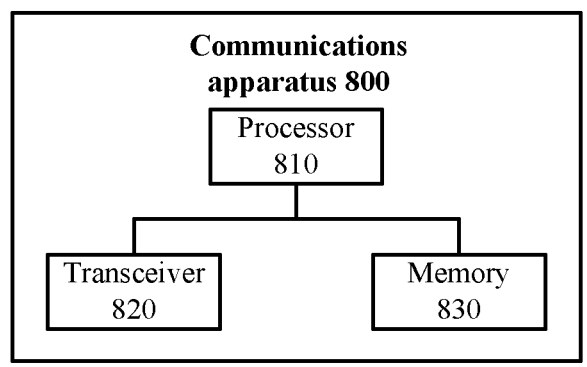
FIG. 8 is a schematic block diagram of still another communications apparatus for data transmission according to an embodiment of this application.

FIG. 8 is a schematic block diagram of still another communications apparatus 800 for data transmission according to an embodiment of this application. The communications apparatus 800 includes a processor 810, a transceiver 820, and a memory 830. The processor 810, the transceiver 820, and the memory 830 communicate with each other by using an internal connection channel. The memory 830 is configured to store an instruction. The processor 810 is configured to execute the instruction stored in the memory 830, to control the transceiver 820 to send and/or receive a signal. Optionally, the processor and the memory that are included in the apparatus may be further implemented by using chips.

The processor 810 is specifically configured to: determine a system frame number of a radio system frame in which a to-be-sent first broadcast channel PBCH is located, where the first PBCH is included in a first synchronization signal burst set (SS burst set), and a period of the first SS burst set is one of a plurality of periods; process a first master information block (MIB) in a first processing manner, to obtain a first transport block, where the first processing manner is used to indicate some bits of the system frame number of the radio system frame in which the first PBCH is located, and the first MIB includes remaining bits, other than the some bits, of the system frame number of the radio system frame in which the first PBCH is located; and control the transceiver 820 to send, by using the first PBCH, the first transport block in the radio system frame in which the first PBCH is located.

It should be understood that the communications apparatus 800 may be specifically the network device in the foregoing embodiment, and may be configured to perform the steps and/or procedures corresponding to the network device in the foregoing method. Optionally, the memory 820 may include a read-only memory and a random access memory, and provide an instruction and data to the processor. A part of the memory may further include a non-volatile random access memory. For example, the memory may further store device-type information. The processor 810 may be configured to execute the instruction stored in the memory. When executing the instruction stored in the memory, the processor 810 is configured to perform the steps and/or procedures corresponding to the network device in the foregoing embodiment.

It should be understood that, in this embodiment of this application, the processor of the communications apparatus may be a central processing unit (CPU). Alternatively, the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor or the processor may be any conventional processor or the like.

Figure 9:
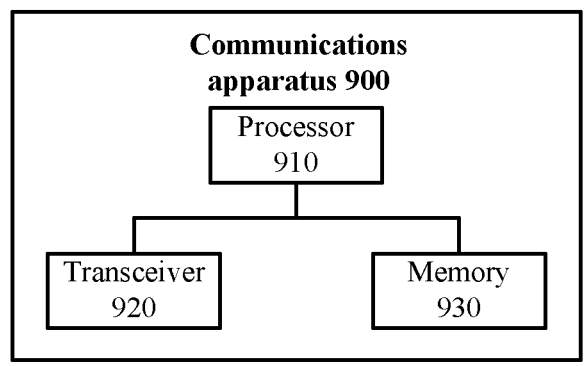
FIG. 9 is a schematic block diagram of yet another communications apparatus for data transmission according to an embodiment of this application.

FIG. 9 is a schematic block diagram of yet another communications apparatus 900 for data transmission according to an embodiment of this application. The communications apparatus 900 includes a processor 910, a transceiver 920, and a memory 930. The processor 910, the transceiver 920, and the memory 930 communicate with each other by using an internal connection channel. The memory 930 is configured to store an instruction. The processor 910 is configured to execute the instruction stored in the memory 930, to control the transceiver 920 to send and/or receive a signal.

Optionally, the processor and the memory that are included in the apparatus may be further implemented by using chips.

The processor 910 is specifically configured to: control the transceiver 920 to obtain a transport block sent by a network device by using a physical broadcast channel (PBCH), where the PBCH is included in a synchronization signal burst set (SS burst set), and a period of the SS burst set is one of a plurality of periods; process the transport block in a processing manner, to obtain a master information block (MIB), and obtain, in the processing manner, some bit positions of the system frame number of the radio system frame in which the PBCH is located and bits in the some bit positions (referred to as some bits hereinafter), where the MIB includes remaining bits, other than the some bits, of the system frame number of the radio system frame in which the PBCH is located; and determine, based on the some bits and the remaining bits, the system frame number of the radio system frame in which the PBCH is located.

It should be understood that the communications apparatus 900 may be specifically the UE in the foregoing embodiment, and may be configured to perform the steps and/or procedures corresponding to the UE in the foregoing method. Optionally, the memory 930 may include a read-only memory and a random access memory, and provide an instruction and data to the processor. A part of the memory may further include a non-volatile random access memory. For example, the memory may further store device-type information. The processor 910 may be configured to execute the instruction stored in the memory. When executing the instruction stored in the memory, the processor 910 is configured to perform the steps and/or procedures corresponding to the UE in the foregoing embodiment.

It should be understood that, in this embodiment of this application, the processor may be a central processing unit (CPU) or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor or the processor may be any conventional processor or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on specific applications and design constraint conditions of the technical solutions. A person skilled in the art may use different methods to implement the described functions for each particular application, but it should not be considered that the implementation goes beyond the scope of this application.

It may be clearly understood by a person skilled in the art that, for ease and brevity of description, for a detailed working process of the foregoing system, communications apparatus, and unit, refer to a corresponding process in the foregoing method embodiments. Details are not described herein again.

In the several embodiments provided in this application, it should be understood that the disclosed system, communications apparatus, and method may be implemented in other manners. For example, the described communications apparatus embodiment is merely an example. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the communications apparatuses or units may be implemented in electronic, mechanical, or other forms.

The units described as separate parts may or may not be physically separate from each other, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   scrambling information bits of a physical broadcast channel (PBCH), using one segment of a plurality of segments of a pseudo-random sequence, to obtain a transport block, wherein the one segment of the plurality of segments of the pseudo-random sequence corresponds to a part of bits of a system frame number of a radio system frame in which the PBCH is located, the part of bits including only $2^{nd}$ and $3^{rd}$ least significant bits of the system frame number; and
   sending the transport block using the PBCH.

2. The communication method according to claim 1, wherein the information bits of the PBCH comprise bits other than the $2^{nd}$ and $3^{rd}$ least significant bits of the system frame number of the radio system frame in which the PBCH is located.

3. The communication method according to claim 1, wherein the one segment of the plurality of segments of the pseudo-random sequence is one of four segments of a pseudo-random sequence which correspond to the $2^{nd}$ and $3^{rd}$ least significant bits of the system frame number.

4. The communication method according to claim 3, wherein the four segments of the pseudo-random sequence are based on one initialization seed for initializing the pseudo-random sequence.

5. The communication method according to claim 3, wherein the four segments of the pseudo-random sequence comprise a first segment of the pseudo-random sequence, a second segment of the pseudo-random sequence, a third segment of the pseudo-random sequence, and a fourth segment of the pseudo-random sequence, wherein:
   the $2^{nd}$ and $3^{rd}$ least significant bits implicitly indicated by the first segment of the pseudo-random sequence are 00, the $2^{nd}$ and $3^{rd}$ least significant bits implicitly indicated by the second segment of the pseudo-random sequence are 01, the $2^{nd}$ and $3^{rd}$ least significant bits implicitly indicated by the third segment of the pseudo-random sequence are 10, and the $2^{nd}$ and $3^{rd}$ least significant bits implicitly indicated by the fourth segment of the pseudo-random sequence are 11.

6. The communication method according to claim 1, wherein the PBCH corresponding to the system frame number is sent on one or both of a first half-frame or a second half-frame of the radio system frame.

7. The communication method according to claim 6, wherein the first half-frame or the second half-frame on which the PBCH is sent is indicated using a demodulation reference signal (DMRS) sequence.

8. The communication method according to claim 6, wherein the first half-frame or the second half-frame on which the PBCH is sent is indicated by one bit in the information bits of the PBCH.

9. The communication method according to claim 1, wherein the PBCH is comprised in a synchronization signal block (SSB).

10. The communication method according to claim 1, wherein the information bits of the PBCH include information bits of a master information block (MIB).

11. An apparatus, comprising:
    a processor configured to scramble information bits of a physical broadcast channel (PBCH), using one segment of a plurality of segments of a pseudo-random sequence, to obtain a transport block, wherein the one segment of the plurality of segments of the pseudo-random sequence corresponds to a part of bits of a system frame number of a radio system frame in which the PBCH is located, the part of bits including only $2^{nd}$ and $3^{rd}$ least significant bits of the system frame number; and
    a transceiver configured to send the transport block using the PBCH.

12. The apparatus according to claim 11, wherein the information bits of the PBCH comprise bits other than the $2^{nd}$ and $3^{rd}$ least significant bits of the system frame number of the radio system frame in which the PBCH is located.

13. The apparatus according to claim 11, wherein the one segment of the plurality of segments of the pseudo-random sequence is one of four segments of a pseudo-random sequence which correspond to the $2^{nd}$ and $3^{rd}$ least significant bits of the system frame number.

14. The apparatus according to claim 13, wherein the four segments of the pseudo-random sequence are based on one initialization seed for initializing the pseudo-random sequence.

15. The apparatus according to claim 13, wherein the four segments of the pseudo-random sequence comprise a first segment of the pseudo-random sequence, a second segment of the pseudo-random sequence, a third segment of the pseudo-random sequence, and a fourth segment of the pseudo-random sequence, wherein:
    the $2^{nd}$ and $3^{rd}$ least significant bits implicitly indicated by the first segment of the pseudo-random sequence are 00, the $2^{nd}$ and 3rd least significant bits implicitly indicated by the second segment of the pseudo-random sequence are 01, the $2^{nd}$ and $3^{rd}$ least significant bits implicitly indicated by the third segment of the pseudo-random sequence are 10, and the $2^{nd}$ and $3^{rd}$ least significant bits implicitly indicated by the fourth segment of the pseudo-random sequence are 11.

16. The apparatus according to claim 11, wherein the PBCH corresponding to the system frame number is sent on one or both of a first half-frame or a second half-frame of the radio system frame.

17. The apparatus according to claim 16, wherein the first half-frame or the second half-frame on which the PBCH is sent is indicated using a demodulation reference signal (DMRS) sequence.

18. The apparatus according to claim 16, wherein the first half-frame or the second half-frame on which the PBCH is sent is indicated by one bit in the information bits of the PBCH.

19. The apparatus according to claim 11, wherein the PBCH is comprised in a synchronization signal block (SSB).

20. The apparatus according to claim 11, wherein the information bits of the PBCH include information bits of a master information block (MIB).

21. An apparatus, comprising:
at least one processor in communication with a memory, the at least one processor configured, upon execution of the instructions of the memory, to perform the following steps:
scramble information bits of a physical broadcast channel (PBCH), using one segment of a plurality of segments of a pseudo-random sequence, to obtain a transport block, wherein the one segment of the plurality of segments of the pseudo-random sequence corresponds to a part of bits of a system frame number of a radio system frame in which the PBCH is located, the part of bits including only $2^{nd}$ and $3^{rd}$ least significant bits of the system frame number; and
send the transport block using the PBCH.

22. The apparatus according to claim 21, wherein the one segment of the plurality of segments of the pseudo-random sequence is one of four segments of a pseudo-random sequence which correspond to the $2^{nd}$ and $3^{rd}$ least significant bits of the system frame number.

23. The apparatus according to claim 22, wherein the four segments of the pseudo-random sequence are based on one initialization seed for initializing the pseudo-random sequence.

24. The apparatus according to claim 22, wherein the four segments of the pseudo-random sequence comprise a first segment of the pseudo-random sequence, a second segment of the pseudo-random sequence, a third segment of the pseudo-random sequence, and a fourth segment of the pseudo-random sequence, wherein:
the $2^{nd}$ and $3^{rd}$ least significant bits implicitly indicated by the first segment of the pseudo-random sequence are 00, the $2^{nd}$ and $3^{rd}$ least significant bits implicitly indicated by the second segment of the pseudo-random sequence are 01, the $2^{nd}$ and $3^{rd}$ least significant bits implicitly indicated by the third segment of the pseudo-random sequence are 10, and the $2^{nd}$ and $3^{rd}$ least significant bits implicitly indicated by the fourth segment of the pseudo-random sequence are 11.

25. The apparatus according to claim 21, wherein the PBCH corresponding to the system frame number is sent on one or both of a first half-frame or a second half-frame of the radio system frame;
the first half-frame or the second half-frame on which the PBCH is sent is indicated using a demodulation reference signal (DMRS) sequence; or
the first half-frame or the second half-frame on which the PBCH is sent is indicated by one bit in the information bits of the PBCH.

26. An apparatus, comprising:
at least one processor in communication with a memory, the at least one processor configured, upon execution of instructions of the memory, to perform the following steps:
receive a physical broadcast channel (PBCH) from a network device; and
process a transport block carried by the PBCH by descrambling the transport block to obtain information bits of the PBCH, the descrambling performed by using one segment of a plurality of segments of a pseudo-random sequence, wherein the one segment of the plurality of segments of the pseudo-random sequence corresponds to a part of bits of a system frame number of a radio system frame in which the PBCH is located, the part of bits including only $2^{nd}$ and $3^{rd}$ least significant bits of the system frame number.

27. The apparatus according to claim 26, wherein the one segment of the plurality of segments of the pseudo-random sequence is one of four segments of a pseudo-random sequence which correspond to the 2nd and 3rd least significant bits of the system frame number.

28. The apparatus according to claim 27, wherein the four segments of the pseudo-random sequence are based on one initialization seed for initializing the pseudo-random sequence.

29. The apparatus according to claim 27, wherein the four segments of the pseudo-random sequence comprise a first segment of the pseudo-random sequence, a second segment of the pseudo-random sequence, a third segment of the pseudo-random sequence, and a fourth segment of the pseudo-random sequence, wherein:
the 2nd and 3rd least significant bits implicitly indicated by the first segment of the pseudo-random sequence are 00, the 2nd and 3rd least significant bits implicitly indicated by the second segment of the pseudo-random sequence are 01, the 2nd and 3rd least significant bits implicitly indicated by the third segment of the pseudo-random sequence are 10, and the 2nd and 3rd least significant bits implicitly indicated by the fourth segment of the pseudo-random sequence are 11.

30. The apparatus according to claim 26, wherein the PBCH corresponding to the system frame number is received on one or both of a first half-frame or a second half-frame of the radio system frame
the first half-frame or the second half-frame on which the PBCH is received is indicated by a demodulation reference signal (DMRS) sequence; or
the first half-frame or the second half-frame on which the PBCH is received is indicated by one bit in the information bits of the PBCH.

* * * * *